United States Patent
Ichikawa et al.

(10) Patent No.: US 7,582,372 B2
(45) Date of Patent: Sep. 1, 2009

(54) PRESSURE REGULATOR FOR FUEL CELL

(75) Inventors: Kenji Ichikawa, Kakuda (JP);
Masamitsu Shinbo, Kakuda (JP); Kouji Sengoku, Shioya-gun (JP); Narihiro Takagi, Haga-gun (JP); Katsumi Saito, Shioya-gun (JP)

(73) Assignee: Keihin Corporation, Tokyo (JP)

( * ) Notice: Subject to any disclaimer, the term of this patent is extended or adjusted under 35 U.S.C. 154(b) by 595 days.

(21) Appl. No.: 10/725,862

(22) Filed: Dec. 1, 2003

(65) Prior Publication Data

US 2004/0224200 A1    Nov. 11, 2004

(30) Foreign Application Priority Data

Nov. 29, 2002    (JP)    ............... 2002-349168

(51) Int. Cl.
*H01M 8/04* (2006.01)
(52) U.S. Cl. ............... 429/25; 429/39; 137/154
(58) Field of Classification Search ............ 429/39; 137/154
See application file for complete search history.

(56) References Cited

U.S. PATENT DOCUMENTS 5,265,644 A * 11/1993 Tuckey .................. 137/510
5,522,416 A * 6/1996 Farrell et al. ............ 137/38
6,407,543 B1   6/2002 Hagio et al.

FOREIGN PATENT DOCUMENTS

| CA | 2261243 | * | 8/1999 |
|---|---|---|---|
| CA | 2254016 | * | 5/2000 |
| JP | 64-069873 | | 3/1989 |
| JP | 05-111217 | | 4/1993 |
| JP | 6-221807 | | 8/1994 |
| JP | 10-252923 | | 9/1998 |
| JP | 11-062631 | | 3/1999 |
| JP | 11-082795 | | 3/1999 |
| JP | 2000-274311 | | 10/2000 |
| JP | 2000-297660 | | 10/2000 |
| JP | 2001-12633 | | 1/2001 |
| JP | 2001-132494 | | 5/2001 |
| JP | 2001-176526 | | 6/2001 |
| JP | 2001-289610 | | 10/2001 |
| JP | 2002-313382 | | 10/2002 |

* cited by examiner

*Primary Examiner*—Mark Ruthkosky
(74) *Attorney, Agent, or Firm*—Lahive & Cockfield, LLP; Anthony A. Laurentano

(57) ABSTRACT

When a stepping motor is de-energized, a valve shaft is turned in a direction to open a valve body under the resilient forces stored in a fully opening spring through a receptacle and a driven plate. At this time, a drive plate is turned in unison with the driven plate. When the valve body reaches a fully open position, a positioning finger on the drive plate abuts against a stopper pin, thus stopping the turning movement of the drive plate.

8 Claims, 3 Drawing Sheets

PRESSURE REGULATOR FOR FUEL CELL

BACKGROUND OF THE INVENTION

1. Field of the Invention

The present invention relates to a pressure regulator for use with a fuel cell for controlling the amount of an oxidizing agent discharged from a cathode of a fuel cell stack thereby to regulate the flow rate or pressure of the oxidizing agent that is supplied to the cathode.

2. Description of the Related Art

A solid polymer membrane fuel cell has a stack of cells each comprising an anode and a cathode, and a solid polymer electrolyte membrane interposed between the anode and the cathode. Hydrogen is supplied as a fuel to the anode of each cell and air is supplied as an oxidizing agent to the cathode of each cell. Hydrogen ions that are generated at the anode by a catalytic reaction move through the solid polymer electrolyte membrane to the cathode. Electric power is generated in the fuel cell by the electrochemical reaction.

A fuel cell system which includes such a stack has an air compressor for supplying air to the cathodes and a pressure control valve for supplying hydrogen to the anodes under a pressure depending on the pressure of air which is given as a signal pressure. The pressure of the reactant gas supplied to the anodes with respect to the pressure of the reactant gas supplied to the cathodes is adjusted to a predetermined pressure for thereby achieving a predetermined power generation efficiency, and the flow rate of the reactant gas supplied to the fuel cell stack is controlled to obtain a desired fuel cell output.

In such solid polymer membrane fuel cell devices, the flow rate or pressure at which the air is supplied is regulated in order to adjust the pressure applied to the solid polymer electrolyte membrane and the differential pressure between the anode and the cathode. Specifically, a discharge line for discharging an unreacted oxidizing agent gas and $H_2O$ generated by electric power generation from the cathode has a pressure regulating valve for regulating the pressure in the cathode (see Japanese laid-open patent publication No. 2001-176526 and Japanese laid-open patent publication No. 2002-313382).

The pressure regulating valve generally comprises a butterfly valve. When a control motor for opening and closing the valve body of the pressure regulating valve is not energized, the valve body is urged by a spring to move in a direction to be closed. When the control motor is energized, it turns in a direction to open the valve body against the resiliency of the spring. Therefore, the pressure regulating valve is a normally closed valve.

If the fuel cell system is mounted on an automobile or the like, for example, then the pressure regulating valve is used in an open state while the automobile is stably running. With the pressure regulating valve being a normally closed valve, therefore, the control motor needs to be energized at all times in order to open the valve while the automobile is running.

SUMMARY OF THE INVENTION

It is a general object of the present invention to provide a pressure regulator for fuel cells which does not consume wasteful electric power when a fuel cell system is in operation, because the pressure regulator has its valve opened when de-energized.

A major object of the present invention is to provide a pressure regulator for fuel cells which is fully opened as a valve body is turned to a fully open position under the resiliency of a resilient member when a motor is de-energized.

Another object of the present invention is to provide a pressure regulator for fuel cells which has a non-contact-type motor and can appropriately be used even in a hydrogen atmosphere.

Still another object of the present invention is to provide a pressure regulator for fuel cells which is capable of preventing water generated as a fuel cell stack generates electric power from entering a motor and other components.

Yet another object of the present invention is to provide a pressure regulator for fuel cells which is prevented from forming rust even when brought into contact with a wet gas that contains water generated as a fuel cell stack generates electric power.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
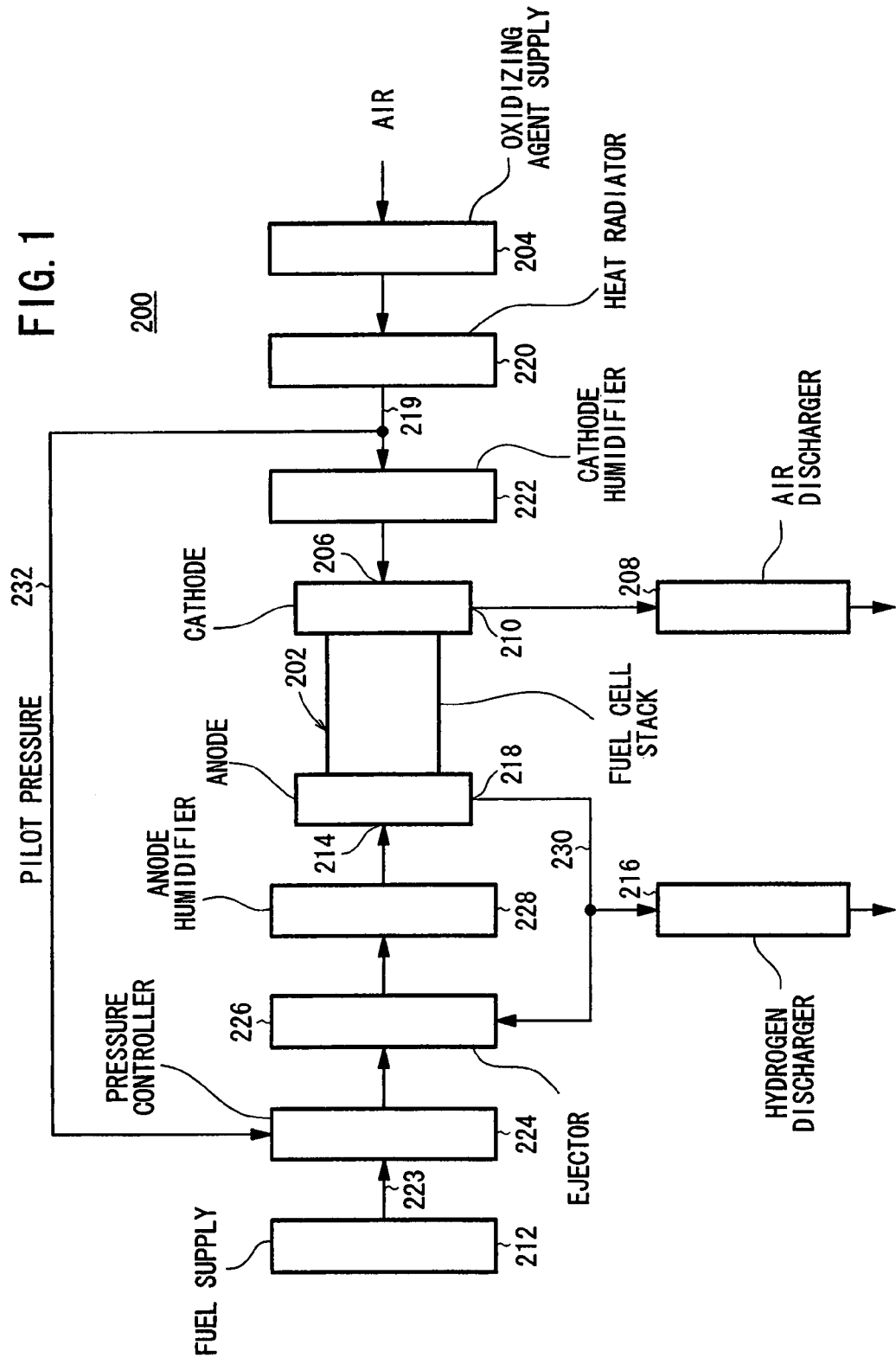
FIG. 1 is a block diagram of a fuel cell system which incorporates a pressure regulator for fuel cells according to an embodiment of the present invention.

FIG. 1 is a block diagram of a fuel cell system 200 which incorporates a pressure regulator for fuel cells according to an embodiment of the present invention. The fuel cell system 200 is mounted on a vehicle such as an automobile or the like.

The fuel cell system 200 includes a fuel cell stack 202 having a stack of cells each comprising an anode and a cathode and a solid polymer electrolyte membrane such as a polymer ion exchange membrane interposed between the anode and the cathode.

The cathode of each cell is supplied with an air containing oxygen as an oxidizing agent, and the anode of each cell with hydrogen as a fuel. Air is supplied from an oxidizing agent supply 204 to a cathode of the fuel cell stack 202 through an air supply port 206. An air discharge port 210 is connected to an air discharger 208 for discharging air in the cathode. Hydrogen is supplied from a fuel supply 212 to an anode of the fuel cell stack 202 through a hydrogen supply port 214. A hydrogen discharge port 218 is connected to a hydrogen discharger 216.

To an air supply passage 219 connected to the air supply port 206, there are connected the oxidizing agent supply 204, a heat radiator 220, and a cathode humidifier 222 that are arranged successively from an upstream region of the air supply passage 219.

The oxidizing agent supply 204 comprises, for example, a supercharger (compressor) and a motor for actuating the supercharger (not shown). The oxidizing agent supply 204 adiabatically compresses air, which contains oxygen to be used as an oxidizing gas in the fuel cell stack 202, and delivers the compressed air. When the air is adiabatically compressed, it is heated. The heated air is effective to warm the fuel cell stack 202.

The heat radiator 220 comprises an intercooler or the like (not shown), for example. The air supplied from the oxidizing agent supply 204 is cooled by a heat exchange with cooling water which flows through a flow passage in the heat radiator 220. Therefore, the air is cooled to a predetermined temperature and then introduced into the cathode humidifier 222.

The cathode humidifier 222 has a water-permeable membrane, for example. The cathode humidifier 222 humidifies the air, which has been cooled to the predetermined temperature by the heat radiator 220, to a certain humidity by passing water from one side of the water-permeable membrane to the other, and supplies the humidified air to the air supply port 206 of the fuel cell stack 202. The humidified air is supplied to the fuel cell stack 202 to supply water to the solid polymer electrolyte membranes of the fuel cell stack 202, thereby keeping the ion conductivity of the solid polymer electrolyte membranes at a certain value or higher.

Figure 2:
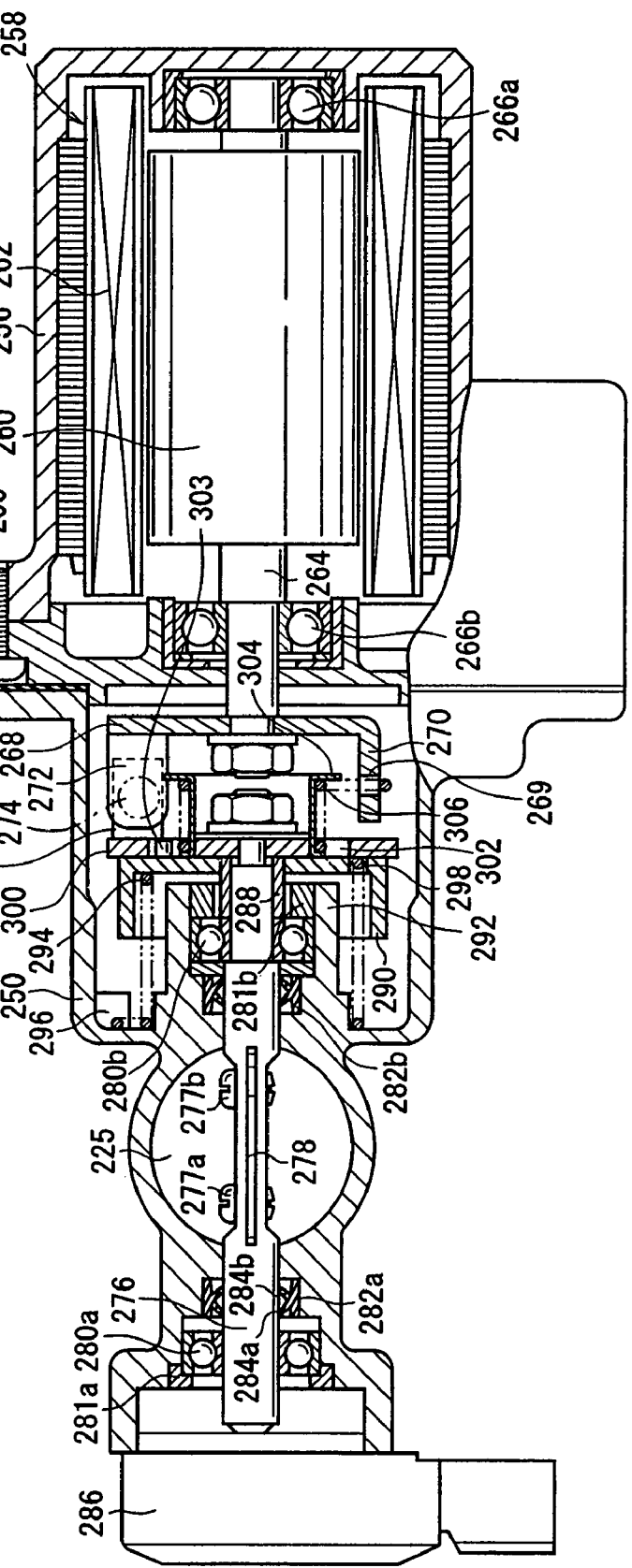
FIG. 2 is a partly cross-sectional view of the pressure regulator for fuel cells according to the embodiment of the present invention.

As described above, the air discharger 208 is connected to the air discharge port 210 of the fuel cell stack 202. The air discharger 208 incorporates a pressure regulator 221 for fuel cells according to the embodiment of the present invention, which is shown in FIG. 2. As the amount of air discharged into the atmosphere is regulated by the pressure regulator 221, the pressure of air supplied to the cathode of the fuel cell stack 202 (see FIG. 1) is controlled.

To a hydrogen supply passage 223 connected to the hydrogen supply port 214, there are connected the fuel supply 212, a pressure controller 224, an ejector 226, and an anode humidifier 228 that are arranged successively from an upstream region of the hydrogen supply passage 223. The hydrogen discharger 216 is connected to the hydrogen discharge port 218 by a circulation passage 230.

The fuel supply 212 comprises a hydrogen gas container (not shown) for supplying hydrogen as a fuel to the fuel cells, for example. The fuel supply 212 stores hydrogen that is to be supplied to the anode of the fuel cell stack 202.

The pressure controller 224 comprises a pneumatic proportional pressure control valve, for example.

The pressure controller 224 is supplied with air through a pressure control bypass passage 232. Specifically, air supplied from the oxidizing agent supply 204 is set to a certain pressure depending on a load on the fuel cell stack 202, an operated amount of an accelerator pedal, not shown, or the like, and then introduced into the fuel cell stack 202. At this time, there is a need for regulating the pressure of hydrogen. Using the pressure of air from the pressure control bypass passage 232 as a pilot pressure (signal pressure), the pressure controller 224 sets a secondary pressure as its outlet pressure to a pressure in a predetermined range corresponding to the pilot pressure.

As can be understood from FIG. 1, the pressure controller 224 is supplied with the air that has been cooled by the heat radiator 220.

The ejector 226 comprises a nozzle and a diffuser (not shown). The hydrogen supplied from the pressure controller 224 is accelerated when it passes through the nozzle, and ejected toward the diffuser. When the hydrogen flows at a high speed from the nozzle to the diffuser, a negative pressure is developed in an auxiliary chamber disposed between the nozzle and the diffuser, attracting the hydrogen discharged from the anode through the circulation passage 230. The hydrogen and the discharged hydrogen that are mixed together by the ejector 226 are supplied to the anode humidifier 228. The hydrogen discharged from the fuel cell stack 202 circulates through the ejector 226.

Therefore, the unreacted hydrogen discharged from the hydrogen discharge port 218 of the fuel cell stack 202 is introduced through the hydrogen passage 230 into the ejector 226. The hydrogen supplied from the pressure controller 224 and the hydrogen discharged from the fuel cell stack 202 are mixed with each other and supplied to the fuel cell stack 202.

The anode humidifier 228 has a water-permeable membrane, for example. The anode humidifier 228 humidifies the fuel, which has been delivered from the ejector 226, to a certain humidity by passing water from one side of the water-permeable membrane to the other, and supplies the humidified fuel to the hydrogen supply port 214 of the fuel cell stack 202. The humidified hydrogen is supplied to the fuel cell stack 202 to keep the ion conductivity of the solid polymer electrolyte membranes of the fuel cell stack 202 at a certain value or higher.

The hydrogen discharger 216 which has a discharge control valve, not shown, is connected to the hydrogen discharge port 218 by the circulation passage 230. The discharge control valve can be opened and closed depending on an operating state of the fuel cell stack 202 for discharging excessive water (mainly liquid water) in a discharged gas which has been separated by a reservoir tank, not shown.

In the fuel cell stack 202, hydrogen ions that are generated at the anode by a catalytic reaction move through the solid polymer electrolyte membrane to the cathode where the hydrogen ions and oxygen cause an electrochemical reaction to generate electric power.

The pressure regulator 221 of the air discharger 208 will be described in detail below with reference to FIGS. 2 and 3.

The pressure regulator 221 has a body 250 having a passage 225 (opening) communicating with the air discharge port 210 of the cathode, and a motor housing 256 mounted on the body 250 by a bolt 255 with a sealing member 252 and a joint plate 254 interposed therebetween.

The motor housing 256 accommodates therein a stepping motor 258 as a drive source. The stepping motor 258 comprises a rotor 260 and a stator 262. A drive shaft 264 is disposed centrally in the rotor 260. The drive shaft 264 has an end rotatably supported on the motor housing 256 by a bearing 266a and an opposite end rotatably supported on the joint plate 254 by a bearing 266b.

The drive source is not limited to the stepping motor 258, but may be a brushless DC/AC motor in view of the environment and atmosphere in which it is used.

The opposite end of the drive shaft 264 extends through the joint plate 254 into the body 250 in which a drive plate 268 is mounted on the tip end of the drive shaft 264. As shown in FIG. 3, the drive plate 268 has a locking finger 270 raised toward the passage 225 and having a locking groove 269 defined therein for locking an end of a joint spring 306, to be described later. The drive plate 268 also has a positioning finger 272 projecting toward the passage 225 for positioning a valve heat, to be described later, in a fully open position. A stopper pin 274 is disposed in a given region of the body 250 for being engaged by the positioning finger 272 to position the valve body in the fully open position.

Figure 3:
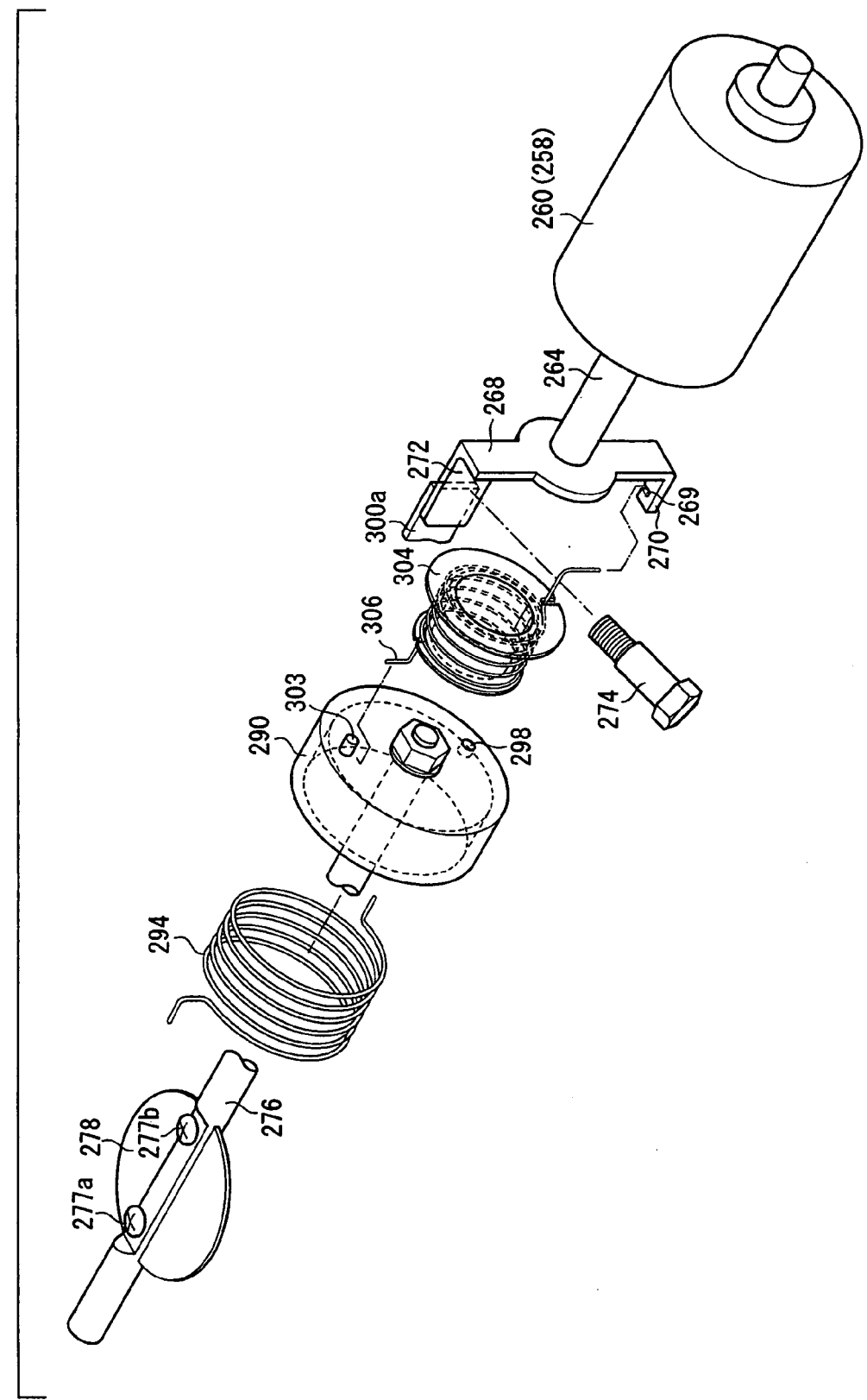
FIG. 3 is a view of parts of the pressure regulator for fuel cells shown in FIG. 2.

As shown in FIGS. 2 and 3, the passage 225 in the body 250 accommodates therein a valve body 278 which is fixed to a valve shaft 276 as a rotational shaft by bolts 277a, 277b as joint members, for controlling the opening of the passage 225. The valve shaft 276 has ends rotatably supported in the body 250 by respective bearings 280a, 280b with sealing members 282a, 282b interposed between the ends of the valve shaft 276 and the body 250 (see FIG. 2). The valve shaft 276, the bolts 277a, 277b, the valve body 278, and the bearings 280a, 280b are all made of stainless steel.

The bearings 280a, 280b are retained in position by respective collars 281a, 281b. Each of the sealing members 282a, 282b comprises a first lip 284a inclined in a direction away from the passage 225 and surrounding the valve shaft 276, and a second lip 284b inclined toward the passage 225 and surrounding the valve shaft 276. The first lip 284a and the second lip 284b are effective in reliably preventing a gas from leaking from the passage 225 into the body 250, and impurities, e.g., lubricating grease on the bearings 280a, 280b, from entering from the body 250 into the passage 225.

An opening sensor 286 for detecting the opening of the valve body 278 with respect to the passage 225 is disposed closely to the end of the valve shaft 276 which is supported by the bearing 280a. The opening sensor 286 may comprise a Hall-effect device for detecting a magnetic field from a magnet embedded in the end of the valve shaft 276 thereby to detect an angular position of the valve shaft 276.

A receptacle 290 is fixed by a collar 288 to the end of the valve shaft 276 which is supported by the bearing 280b. A fully opening spring 294 (resilient member) for normally urging the valve body 278 into a fully open state is disposed around a boss 292 which supports the valve shaft 276. As shown in FIG. 2, the fully opening spring 294 has an end engaging a step 296 of the body 250 and an opposite end engaging in a hole 298 defined in the receptacle 290, thus connecting the body 250 and the receptacle 290 to each other. Stated otherwise, the body 250 and the receptacle 290 are connected to each other by the fully opening spring 294.

A driven plate 300 is fixed to the receptacle 290. The driven plate 300 has an encircling groove 302 defined centrally therein, and a projecting pin 303 on an end face of the receptacle 290 is inserted in the groove 302.

A reception member 304 is fixedly placed in the groove 302 in the driven plate 300. The joint spring 306 which interconnects the valve shaft 276 and the drive shaft 264 of the stepping motor 258 is disposed around a circumferential side wall of the reception member 304. The joint spring 306 has an end engaging the projecting pin 303 of the driven plate 300 and an opposite end engaging in the locking groove 269 defined in the drive plate 268.

The driven plate 300 has an engaging arm 300a held in engagement with a reverse side of the positioning finger 272.

The pressure regulator 221 for fuel cells according to the embodiment of the present invention is basically constructed as described above. Operation of the pressure regulator 221 will be described below.

When the fuel cell stack 202 is at rest, not generating electric power, the valve body 278 of the pressure regulator 221 is fully opened to connect the air discharge port 210 to the discharge line through the passage 225 (see FIG. 2).

For starting to generate electric power with the fuel cell stack 202, the valve body 278 is fully closed to block the passage 225 in order to supply air under high pressure to the cathode to promote a power generating reaction.

At this time, the stepping motor 258 is energized to turn the drive shaft 264 in a direction to close the valve body 278. The drive plate 268 fixed to the drive shaft 264 is turned, turning the driven plate 300. Since the driven plate 300 is fixed to the valve shaft 276, the valve body 278 closes the passage 225 when the valve shaft 276 is turned 90° from the state shown in FIG. 2.

Inasmuch as the fully opening spring 294 disposed around the boss 292 of the body 250 has one end engaging the body 250 and the opposite end engaging the receptacle 290 which turns in unison with the valve shaft 276, the fully opening spring 294 is twisted, storing resilient forces for urging the valve body 278 in a direction to be fully opened.

While the passage 225 is being thus blocked by the pressure regulator 221, air is compressed by the oxidizing agent supply 204, then cooled to a predetermined temperature by the heat radiator 220, humidified by the cathode humidified 222, and supplied from the air supply port 206 to the cathode. Hydrogen supplied from the fuel supply 212 is regulated into a predetermined pressure by the pressure controller 224 depending on the pilot pressure of air supplied from the bypass passage 232. Thereafter, the hydrogen is delivered through the ejector 226, humidified by the anode humidifier 228, and supplied from the hydrogen supply port 214 to the anode. As a result, the fuel cell stack 202 starts generating electric power. Because the pressure of air supplied to the cathode has been increased by closing the valve in the pressure regulator 221, a reaction to generate electric power in an initial phase is promoted.

After the power generating state is stabilized, the pressure regulator 221 is controlled to open its valve according to a desired electric current to be generated, for thereby controlling the pressure of air to be supplied to the fuel cell stack 202. That is, the stepping motor 258 is energized in the same manner as described above, opening the valve body 278 to an angle depending on the desired electric current to be generated.

According to the present embodiment, since the stepping motor 258 is used as a drive source for turning the valve shaft 276, the opening of the valve body 278 can easily be adjusted. As the opening of the valve body 278 is adjusted, the flow rate and pressure of air supplied to the cathode of the fuel cell stack 202 are adjusted, thus easily controlling the amount of electric power generated by the fuel cell stack 202.

For bringing the valve body 278 into a fully open position, the stepping motor 258 is de-energized.

Specifically, when the stepping motor 258 is de-energized, the valve shaft 276 is turned in a direction to open the valve body 278 under the resilient forces stored in the fully opening spring 294 through the receptacle 290 and the driven plate 300. At this time, the drive plate 268 is turned in unison with the driven plate 300.

When the valve body 278 reaches the fully open position upon the turning movement of the valve shaft 276, the positioning finger 272 on the drive plate 268 abuts against the stopper pin 274, thus stopping the turning movement of the drive plate 268.

Even when the fuel cell stack 202 stops generating electric power, the pressure regulator 221 keeps the valve body 278 fully open, making it possible to discharge air containing water from the air discharge port 210.

According to the present embodiment, therefore, for fully opening the valve body 278 while the fuel cell stack 202 is in operation or not in operation, the stepping motor 258 may be de-energized. Stated otherwise, for fully opening the valve body 278, the stepping motor 258 does not need to be energized. Consequently, the amount of electric power required to operate the fuel cell system 200 can be reduced, with the result that the fuel cell system 200 can be operated with low electric power.

According to the present embodiment, therefore, for discharging air from the cathode of the fuel cell stack 202, the stepping motor 258 for actuating the valve body 278 is de-energized, and the passage 225 is kept fully open only under the resilient forces of the fully opening spring 294. Consequently, wasteful electric power is not consumed to keep the passage 225 fully open.

As described above, at the cathode of the fuel cell stack 202, hydrogen ions, oxygen, and electrons cause an electrochemical reaction to generate $H_2O$. Therefore, a wet gas containing water or water vapor passes through the passage 225.

Since the valve shaft 276, the bolts 277a, 277b, the valve body 278, and the bearings 280a, 280b are made of stainless steel, the formation of rust on these components is greatly suppressed. As the valve shaft 276 and the valve body 278 operate reliably, the pressure regulator 221 can reliably be closed and opened.

Even when water in the wet gas is attached to the valve body 278 and then condensed into water, the water is blocked by the sealing members 282*a*, 282*b* that are interposed between the valve body 278 and the bearings 280*a*, 280*b*. Therefore, no water flows into the body 250 and the opening sensor 286. Thus, defects such as rust and short circuits are prevented from occurring which would otherwise be caused by water finding its way into electric circuits of the stepping motor 258 and the opening sensor 286.

Although a certain preferred embodiment of the present invention has been described by way of example, it is clear that various changes and modifications may be made therein by those skilled in the art without departing from the scope and spirit of the present invention.

What is claimed is:

1. A pressure regulator for fuel cells, which is disposed in a discharge line for discharging an oxidizing agent supplied to a cathode of fuel cells, for controlling a discharged amount of the oxidizing agent to regulate the pressure of the oxidizing agent in the cathode, comprising:
    an opening for passing said oxidizing agent therethrough;
    a valve body for opening or closing said opening;
    a resilient member for urging a rotational shaft to which said valve body is connected, to turn in a direction to open said opening, wherein said rotational shaft is supported by a bearing;
    a sealing member disposed between said bearing and said opening, wherein the sealing member comprises a first lip inclined away from the opening and a second lip inclined toward the opening;
    a limiting member for limiting an angular position of the valve body which is turned by said resilient member, to keep said opening fully open;
    a non-contact type motor energizable for turning said valve body in a direction to close said opening against resilient forces of said resilient member, wherein when the non-contact type motor is de-energized, the opening is fully open for discharging water from the fuel cells without consuming electric power; and
    an opening sensor for detecting a magnetic field from a magnet embedded in said rotational shaft thereby to detect an angular position of said rotational shaft.

2. A pressure regulator for fuel cells according to claim 1, wherein said motor comprises a brushless motor.

3. A pressure regulator for fuel cells according to claim 1, wherein said motor comprises a stepping motor.

4. A pressure regulator for fuel cells according to claim 1, wherein said valve body, said rotational shaft, and/or said bearing are made of stainless steel.

5. A pressure regulator for fuel cells according to claim 3, wherein said rotational shaft is supported by a bearing, with a sealing member disposed between said bearing and said opening.

6. A pressure regulator for fuel cells according to claim 3, wherein said valve body, said rotational shaft, and/or said bearing are made of stainless steel.

7. A pressure regulator for fuel cells according to claim 1, wherein said pressure regulator is incorporated in a fuel cell system including a fuel cell stack having an anode and a cathode;
    said pressure regulator is disposed in a discharger for discharging the oxidizing agent supplied to said cathode; and
    wherein for increasing the pressure of the oxidizing agent supplied to said cathode, said motor is energized to displace said valve body in the direction to close said opening.

8. A pressure regulator for fuel cells according to claim 7, wherein said fuel cell system is mounted on vehicles including automobiles.

* * * * *